(No Model.) 3 Sheets—Sheet 1.

F. P. DUPLAIN.
ELECTRICAL CABLE.

No. 303,924. Patented Aug. 19, 1884.

Witnesses
W. C. Corlies
George P. Barton

Inventor
Francis P. Duplain
By Barton & DeWolf
Attorneys

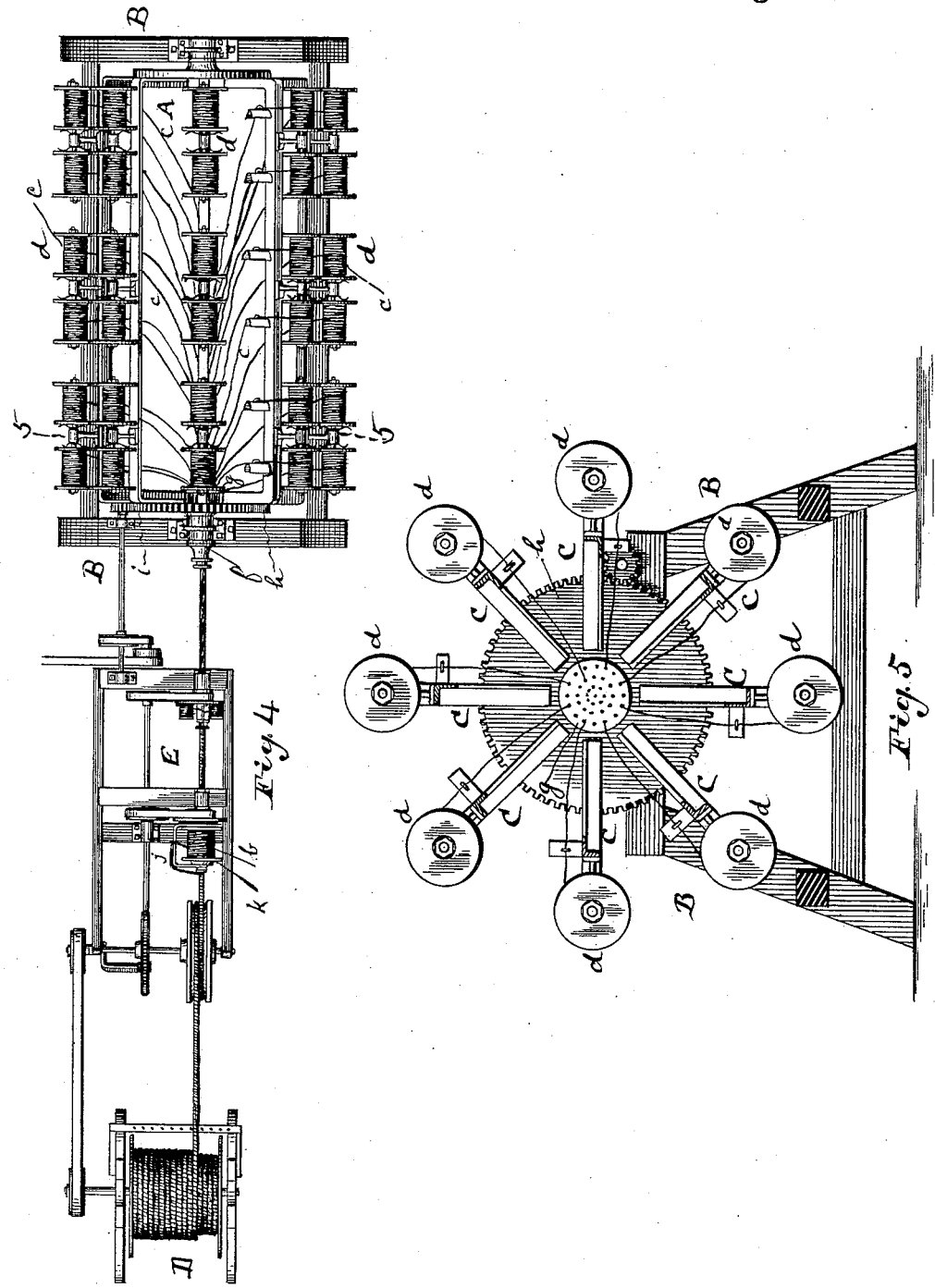

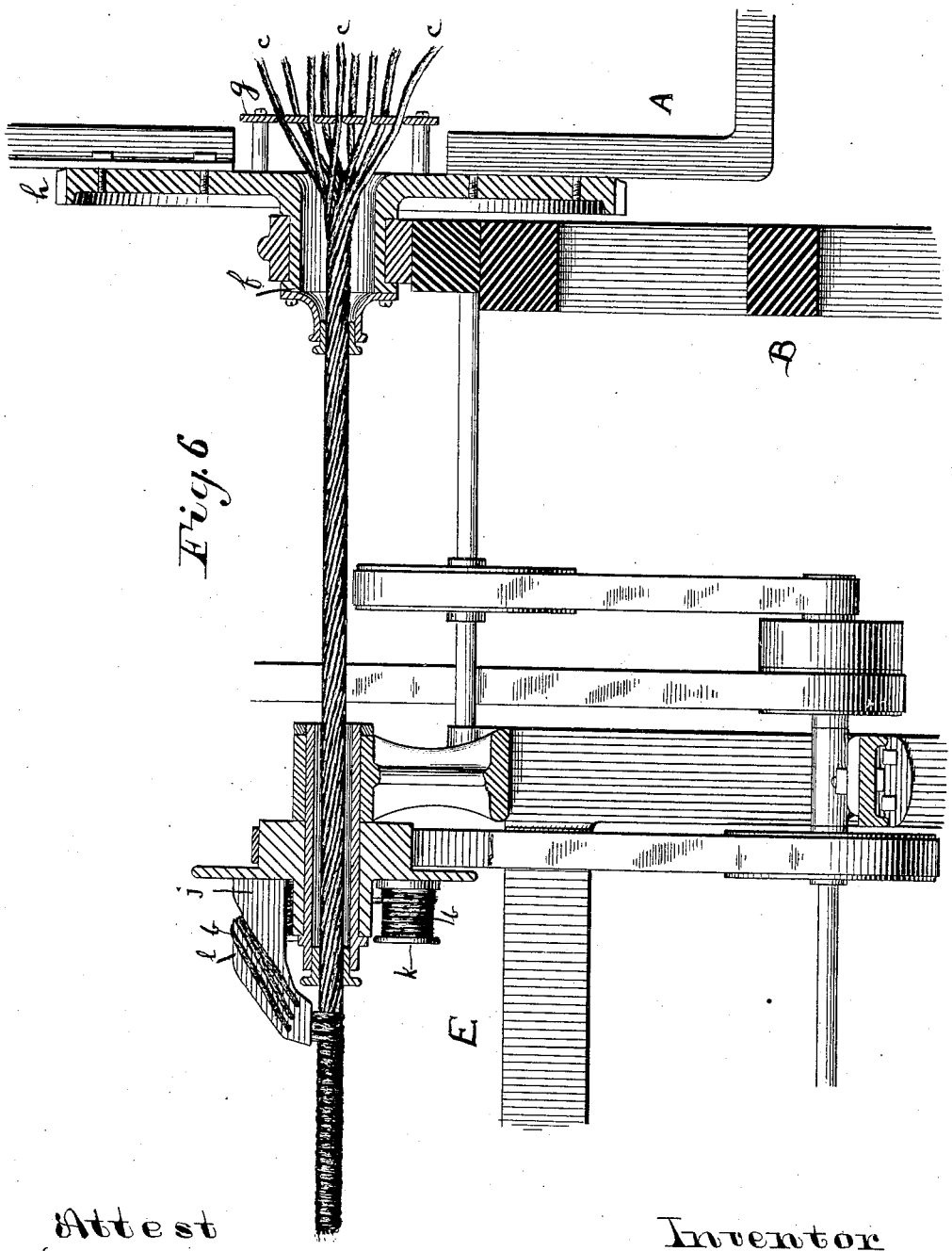

UNITED STATES PATENT OFFICE.

FRANCIS P. DUPLAIN, OF CHICAGO, ILL., ASSIGNOR, BY MESNE ASSIGN-
MENTS, TO THE WESTERN ELECTRIC COMPANY, OF SAME PLACE.

ELECTRICAL CABLE.

SPECIFICATION forming part of Letters Patent No. 303,924, dated August 19, 1884.

Application filed March 8, 1880. (No model.)

*To all whom it may concern:*

Be it known that I, FRANCIS P. DUPLAIN, of Chicago, in the county of Cook and State of Illinois, have invented a new and useful Improvement in Electrical Cables; and I hereby declare the following to be such a full, clear, concise, and exact description thereof, as will enable those skilled in this department of telegraphy to apply the same, reference being had to the accompanying drawings.

My invention is of great utility when it is desired to lay that class of telegraph-lines generally known as "oil-cables" in long sections. The conductors consist of copper wires covered with cotton or other fibrous material. Prior to my invention the conductors were usually stretched out parallel and bound together, forming a bundle of conductors substantially parallel to one another. It was found very difficult to draw such a bundle of conductors within the pipe. It was usual to work, section by section, the pipe over the conductors, in order to avoid, as far as possible, kinking, breaking, or wearing them in two; yet when this precaution was taken, frequently it happened that a number of the conductors would be found inoperative. The knots caused by the kinking coming in contact with the interior of the pipe would be worn, so as to bring the bare wires against the metallic pipe, and thus they would be grounded if not broken or worn in two. I have discovered that by twisting the conductors together, so that they severally take the form of spirals when bound together into a bundle or cable, they may be drawn without injury into a pipe laid in very long sections; and the pipe may be of less diameter or bore than was formerly required for a cable of parallel conductors.

Cables made up of twisted wires are of course old; but, so far as I am aware, such cables have never before been transversely wound with fibrous material to bind them securely together and prevent them from untwisting; nor have such cables, as far as I am aware, been inclosed in a closely-fitting pipe. By the use of my improvement a cable of one and one-eighth inch in diameter may readily and without danger of injury be drawn into an inch-and-one-quarter pipe in sections of from one to two thousand feet.

My invention is of great utility when the sections are less than one thousand feet, and in all cases where it is of advantage to have the cable of conductors approximately fill the pipe.

Figure 1:
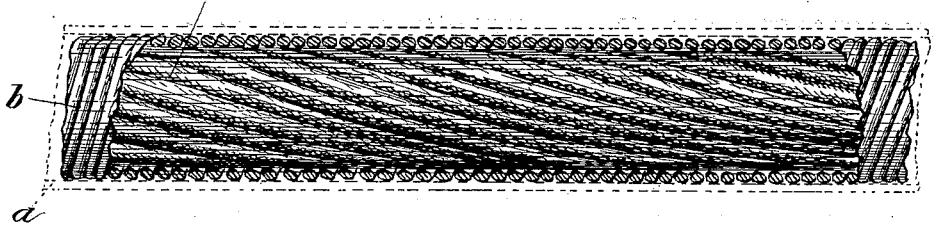
Figure 2:
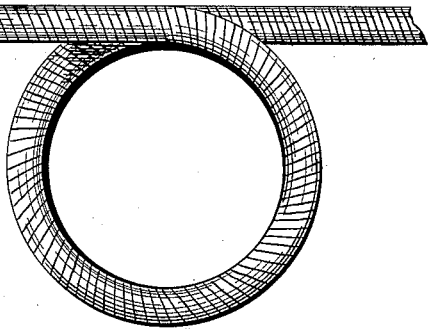
Figure 3:
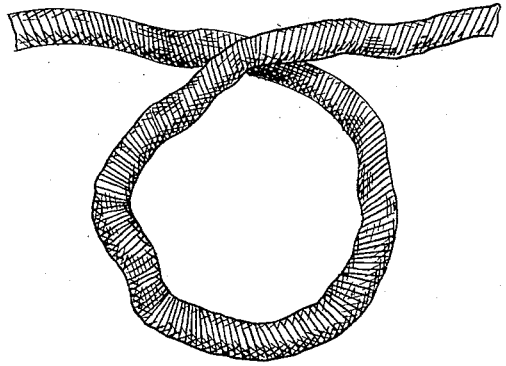

In the drawings, Figure 1 represents an oil-cable embodying my invention. The iron pipe *a* is indicated by dotted lines, and fits closely to the transversely-wound covering *b* of the spiral conductors *c*, which are (partially) uncovered, as shown. Figs. 2 and 3 are plan views of cables of the same number of conductors. In cable represented by Fig. 2, the conductors are arranged spirally, as shown in Fig. 1, while Fig. 3 represents the exterior of a cable of parallel conductors as heretofore made. The one may be handled and bent or drawn into the pipe without liability of kinking or receiving injury, while the other is sure to cause great trouble and annoyance, as before indicated, and as has been practically demonstrated. The conductors may be twisted or formed into spirals in any suitable manner. I find it most convenient to arrange the spools of insulated conductors on the outside of a cylinder, and allow the several strands to pass out toward the winding-machine through the central portion of one end of the cylinder.

I have illustrated in the accompanying drawings the best means known to me for twisting insulated wires into a cable and for transversely wrapping and binding a cable thus formed.

Fig. 4 is a plan view of a wire-twisting and a cable-binding machine. Fig. 5 is a transverse section of the same on the line 5 5 of Fig. 4, and Fig. 6 is a section showing the twisted cable and an enlarged view of the appliance for transversely winding or binding the cable.

The cylindrical frame A is journaled in suitable standards, B, and carries a series of radial arms, C, on the ends of which are pivoted spools *d*, carrying insulated wires *c*. The journal or hub *f* of the cylinder is hollow, and is provided on its inner end with a perforated disk, *g*. The wires *c* are led from the spools *d* through the perforated disk, and through the hollow journal to appliances for transversely wrapping or binding the cable after it is twisted, and thence to a reel, D.

Secured to the journal or hub $f$ is a cog-wheel, $h$, which meshes with a pinion, $i$, that is driven by suitable mechanism, as illustrated in the drawings. The twisted cable is led through suitable guides in a frame, E, and as it traverses this frame the cable is transversely wound by a serving of fibrous material, $b$.

Any suitable means may be employed for binding the cable; but I prefer to employ a frame, $j$, carrying a series of spools, $k$, containing the fibrous cord or tape. The cable passes through the hollow journal or hub of this frame, and the frame revolves around the cable and supplies the fibrous material over suitable guides, $l$. This frame may be driven in any suitable way, and all the movements of the entire machine are so timed as to twist and wind the cable with precision, and the operation is simultaneous, so that while one part of the cable is being twisted another part is being wound or bound. One revolution for each eighteen inches of a cable of twenty-five wires I find sufficient to twist the wires into a firm cable. This motion may be increased or diminished, as required, by the number of conductors. Different operators would also give the cylinder more or less motion, as they might think best. When the cable is thus formed of conductors arranged spirally, it is dried in the usual manner. Then the pipe may be laid in sections of half a mile, or more, if desired, after which the cable is easily drawn therein. The cable does not kink, and hence there is no danger of injury to the conductors by friction or otherwise. The length of the sections is limited only by the strength of the cable, which is, moreover, rendered much stronger by my improvement. Oil or gas under pressure is introduced into the pipe to protect the wires.

My invention is not limited to any particular fluid that may be used for this purpose. It relates mainly to forming the cable of conductors arranged spirally and bound together, so that the cable thus formed may be drawn into the pipe without kinking or otherwise injuring the insulation of the wires, and when once in place the cable fits snugly in the pipe without slipping or untwisting.

I am aware that lead pipe has been heretofore proposed for covering cables formed of conductors similar to mine; and I am aware, also, that iron pipe has been employed for covering conductors materially different from mine, but a lead-pipe covering is impracticable on account of the softness and flexibility of the lead, as well as on account of its liability to destruction by rats and otherwise; but I am not aware that a complete covered cable like mine, which accomplishes the maximum of conductivity and security at the same time with the minimum of weight and cost of production, has been known prior to my invention thereof.

I claim—

The combination of the separately-insulated conducting-wires twisted together so as to form a substantially cylindrical cable, the outside wires of which have a spiral trend, the fibrous sheathing wound around the twisted cable transversely to its length, and the iron pipe with an opening only substantially equal to the diameter of the cable, into which the cable is drawn, so as to fit snugly the interior of the pipe, substantially as set forth.

FRANCIS P. DUPLAIN.

Witnesses:
CALVIN DE WOLF,
WALLACE L. DE WOLF.